(12) United States Patent
Davis et al.

(10) Patent No.: US 9,919,395 B2
(45) Date of Patent: Mar. 20, 2018

(54) METHOD FOR CONTROLLING TOOL CHANGE OPERATIONS AND MACHINE TOOL

(71) Applicant: MAG IAS GmbH, Eislingen (DE)

(72) Inventors: Ralph Davis, Eislingen (DE); Walter Pompe, Gingen/Fils (DE); Dodwell Manoharan, Esslingen (DE)

(73) Assignee: MAG IAS GmbH, Eislingen (DE)

( * ) Notice: Subject to any disclaimer, the term of this patent is extended or adjusted under 35 U.S.C. 154(b) by 344 days.

(21) Appl. No.: 14/716,276

(22) Filed: May 19, 2015

(65) Prior Publication Data

US 2015/0248128 A1 Sep. 3, 2015

Related U.S. Application Data

(63) Continuation of application No. PCT/EP2013/074289, filed on Nov. 20, 2013.

(30) Foreign Application Priority Data

Nov. 21, 2012 (DE) .................. 10 2012 111 230

(51) Int. Cl.
 *B23Q 3/155* (2006.01)
 *G05B 19/418* (2006.01)
 (Continued)

(52) U.S. Cl.
 CPC ...... *B23Q 3/15503* (2016.11); *B23Q 3/15526* (2013.01); *B23Q 3/15539* (2016.11);
 (Continued)

(58) Field of Classification Search
 CPC ............ B23Q 3/15503; B23Q 3/15539; G05B 2219/34347; G05B 2219/36361;
 (Continued)

(56) References Cited

U.S. PATENT DOCUMENTS

| 5,474,514 A | 12/1995 | Rütschle et al. |
| 2007/0184954 A1* | 8/2007 | Muser ................ B23Q 3/15526 483/1 |

(Continued)

FOREIGN PATENT DOCUMENTS

| CN | 101934482 | 1/2011 |
| DE | 22 39 774 | 2/1974 |

(Continued)

OTHER PUBLICATIONS

EPO Machine Translation of DE10236342A1—"Method for fitting tools in magazines in machining centres for vehicle components involves moving tools into transfer position in parallel time whilst machining process continues on workpiece," Feb. 19, 2004.*

*Primary Examiner* — Sunkil K Singh
*Assistant Examiner* — Michael Vitale
(74) *Attorney, Agent, or Firm* — Womble Bond Dickinson (US) LLP

(57) ABSTRACT

A method is proposed for controlling tool change operations on a machine tool, wherein a machining procedure on a workpiece includes a sequence of machining operations having in each case a particular tool and in each case a particular duration, and for a tool change, tools of a tool spindle are provided by a second storage device in communication with a first storage device, and wherein there is associated with the machining procedure a sequence of tool provision operations in which a tool provision operation has in each case a particular duration, wherein the method includes a determination stage wherein the durations of the machining operations and the tool provision operations are determined, and a control stage wherein the tool provision operations are temporally grouped in relation to the machining operations such that the tool provision operations bring about a minimized idle time in the machining procedure.

27 Claims, 8 Drawing Sheets

(51) Int. Cl.
*B23Q 3/157* (2006.01)
*B23Q 39/00* (2006.01)

(52) U.S. Cl.
CPC ..... *B23Q 3/15773* (2013.01); *B23Q 3/15786* (2013.01); *G05B 19/4187* (2013.01); *B23Q 2039/002* (2013.01); *G05B 2219/32276* (2013.01); *G05B 2219/36364* (2013.01); *G05B 2219/50263* (2013.01); *Y10T 483/10* (2015.01); *Y10T 483/12* (2015.01); *Y10T 483/127* (2015.01); *Y10T 483/1855* (2015.01)

(58) Field of Classification Search
CPC ........... G05B 2219/36362; G05B 2219/36364; G05B 2219/50263; G05B 2219/50272; Y10T 483/10; Y10T 483/12; Y10T 483/123; Y10T 483/127; Y10T 483/1845; Y10T 483/1855
USPC .................... 700/179; 483/1, 4, 5, 6, 63, 64
See application file for complete search history.

(56) References Cited

U.S. PATENT DOCUMENTS

| | | |
|---|---|---|
| 2007/0293379 A1 | 12/2007 | Feinauer et al. |
| 2010/0004107 A1 | 1/2010 | Amaya et al. |
| 2010/0145497 A1 | 6/2010 | Eckhardt et al. |
| 2014/0187397 A1 | 7/2014 | Abeln et al. |
| 2014/0187398 A1 | 7/2014 | Abeln et al. |

FOREIGN PATENT DOCUMENTS

| | | | | |
|---|---|---|---|---|
| DE | 199 50 318 | 10/2001 | | |
| DE | 101 63 294 | 7/2003 | | |
| DE | 102 36 342 | 2/2004 | | |
| EP | 1 175 958 | 1/2002 | | |
| JP | 01115538 A | * | 5/1989 | ......... B23Q 3/15526 |
| JP | 03-184736 | 8/1991 | | |
| JP | 08187640 A | * | 7/1996 | ......... B23Q 3/15537 |
| JP | 09-029575 | 2/1997 | | |
| JP | 2005-324262 | 11/2005 | | |
| JP | 2008 149416 | 7/2008 | | |

* cited by examiner

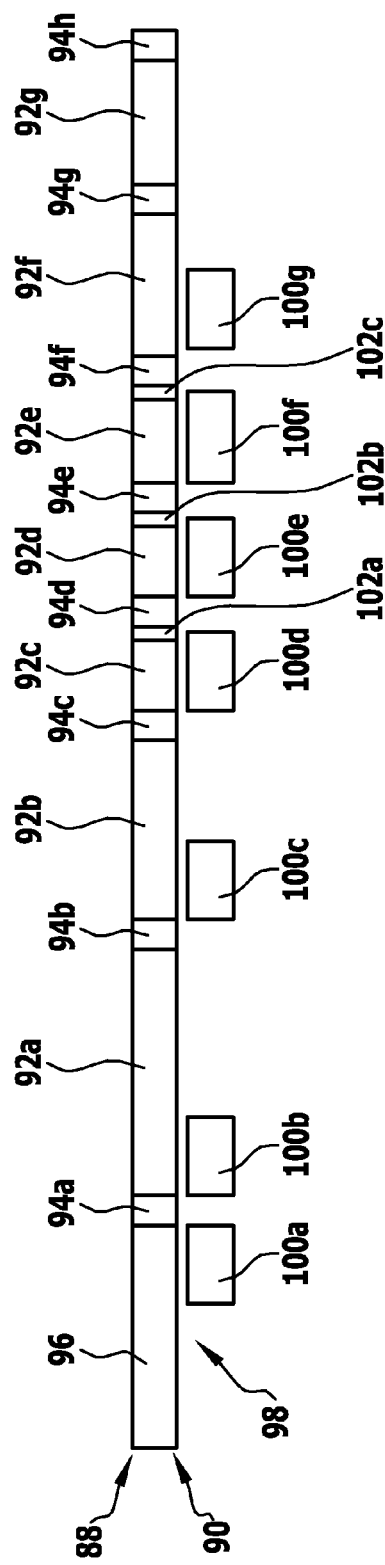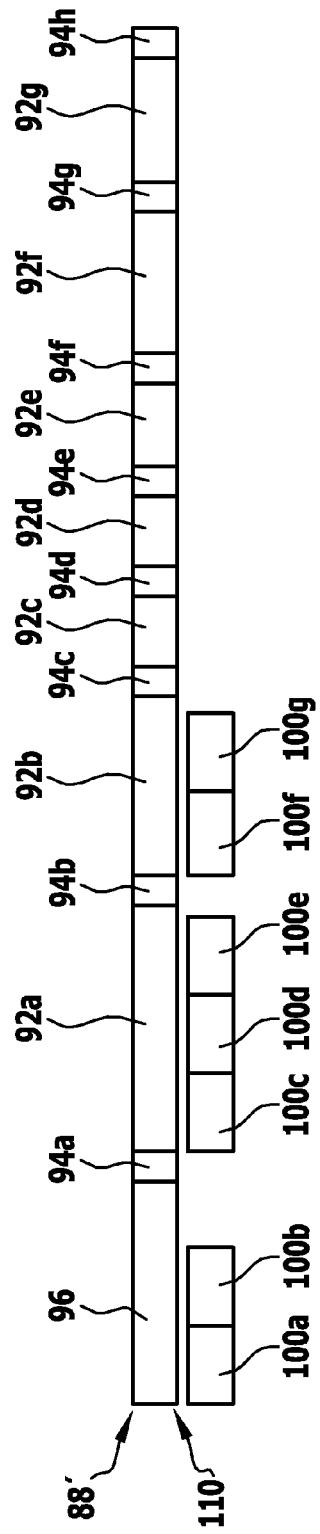

METHOD FOR CONTROLLING TOOL CHANGE OPERATIONS AND MACHINE TOOL

CROSS-REFERENCE TO RELATED APPLICATIONS

The present application is a continuation of international application number PCT/EP2013/074289, filed on Nov. 20, 2013 and claims the benefit of German application number 10 2012 111 230.4, filed on Nov. 21, 2012, the entire specification of both being incorporated herein by reference.

BACKGROUND OF THE INVENTION

The invention relates to a method for controlling tool change operations on a machine tool, wherein the machine tool includes: a machine frame, at least one tool spindle which is arranged on the machine frame and is displaceable relative thereto, a first storage device for tools and a second storage device for tools which is in communication with the first storage device and the at least one tool spindle, wherein a tool change at the at least one tool spindle takes place by way of the second storage device.

The invention further relates to a machine tool, including a machine frame, at least one tool spindle which is arranged on the machine frame and is displaceable relative thereto, a first storage device for tools and a second storage device for tools which is in communication with the first storage device and the at least one tool spindle, wherein a tool change at the at least one tool spindle takes place by way of the second storage device.

PCT/EP2012/067368, dated 6 Sep. 2012, discloses a machine tool including a machine frame, at least one tool spindle which is arranged on the machine frame and is displaceable relative thereto, a workpiece holder and a storage device for tools which is arranged on the machine frame, wherein at least one rotary disc-type store for tools which is in communication with the storage device and in communication with the at least one tool spindle is arranged on the machine frame, wherein a separate disc-type store is associated with each tool spindle, and wherein the storage device includes a rotational conveying device. In this machine tool, the storage device corresponds to a first storage device and the at least one disc-type store corresponds to a second storage device.

PCT/EP2012/067310, dated 5 Sep. 2012, discloses a machine tool including a machine frame, at least one tool spindle which is arranged on the machine frame and is displaceable relative thereto, a workpiece holder and a storage device for tools which is arranged on the machine frame, wherein a chain-type storage device is in communication with the storage device and the at least one tool spindle. In this machine tool, the storage device corresponds to a first storage device and the chain-type storage device corresponds to a second storage device.

DE 10 2006 028 970 A1 discloses a method for machining a workpiece, having the following steps: providing a machine tool having a tool receptacle for receiving a machining tool, providing a tool magazine having a multiplicity of storage positions which are equipped with a multiplicity of machining tools in a first spatial sequence in relation to one another, and machining the workpiece in a defined temporal sequence of machining tools, wherein in the course of the temporal sequence a respective preceding machining tool that is clamped in the tool receptacle is replaced by a successive machining tool from the tool magazine, and wherein the preceding machining tool is deposited in the tool magazine in a defined storage position. As they are returned to the tool magazine, the preceding machining tools are allocated to the storage position in a second spatial sequence, wherein the second spatial sequence is different from the first spatial sequence and corresponds at least in large part to the temporal sequence.

DE 43 04 361 A1 discloses a machine tool having an associated machine magazine for receiving a plurality of tools that are movable in a first transport direction, a change magazine for receiving a plurality of tools that are movable in a second transport direction and are to be replaced in or removed from the machine magazine, and having at least one transfer device for the tool change between the machine magazine and the change magazine. The first and second transport directions are opposed to one another.

US 2010/0004107 A1 discloses a tool exchange system which includes a tool conveyor assembly for holding tools and for conveying the tools between a tool magazine and a machining center, and includes a tool exchange arm, an intermediate magazine, and a computer for controlling the system by providing machining sequences and machining times.

JP 09029575 A discloses a method and an arrangement for reordering tools in a machine tool.

SUMMARY OF THE INVENTION

In accordance with the present invention, a method is provided by means of which the duration of a procedure of machining a workpiece can be minimized.

In accordance with an embodiment of the invention, a machining procedure on a workpiece includes a sequence of machining operations having in each case a particular tool and in each case a particular duration, and for a tool change tools of the at least one tool spindle are provided by the second storage device in communication with the first storage device, and wherein there is associated with the machining procedure a sequence of tool provision operations in which a tool provision operation has in each case a particular duration, wherein the method includes a determination stage and a control stage, and in the determination stage for the machining procedure the durations of the machining operations and the tool provision operations are determined, and in the control stage the tool provision operations are temporally grouped in relation to the machining operations such that the tool provision operations bring about a minimized idle time in the machining procedure.

Tool provision operations should always take place during machining operations so that a tool provision operation does not increase the duration of the machining procedure.

In the method according to the invention, first the durations of the machining operations and of the tool provision operations are determined, and a corresponding association can then be performed in the control stage in order to minimize idle times.

In connection therewith, it is in principle possible for the association to be carried out once and then fixed. It is also possible to carry out real-time determination and control.

As a result of the method according to the invention, appropriate data sets which correspond to an optimized sequence for the machining procedure and an optimized sequence for the tool provision operations are provided. This data is then provided in particular to a control of the machine tool in order to control a machining operation, including the tool provision operations.

It is favorable if the duration of a machining procedure on a workpiece is made up of the duration of a workpiece change operation, the durations of the individual machining operations, the durations of tool change operations between machining operations, and idle times for tool provision operations, wherein a control objective of the control stage is to minimize and in particular to eliminate these idle times. The effect is hence that the duration of the machining procedure is minimally dependent on tool provision operations. In particular, the effect should be that the duration of the machining procedure is independent of tool provision operations.

Where appropriate, in the control stage, tool provision operations are regrouped in temporal association with machining operations in order to minimize the idle times. In that case in particular corresponding instructions are passed to a control of the machine tool in order appropriately to take into account the regrouping during a machining procedure.

It is quite particularly advantageous if the tool provision operations are carried out within the interval and in particular exclusively within the interval of machining operations. In that case no more idle times for tool provision operations occur in the machining procedure.

In particular, one or more tool provision operations are grouped between the start and the end of an interval of a machining operation, wherein a control objective is not to go beyond the end of the interval of the machining operation. As a result, the machining procedure is then independent of tool provision operations.

In particular, in the determination stage and the control stage, a workpiece change is taken into account with its respective duration, wherein the duration of a workpiece change is determined and where appropriate one or more tool provision operations is grouped into the interval of the workpiece change operation. This results in optimized use of time. For a first machining operation, the appropriate tool is then also available.

In particular, in the machining procedure between different machining operations, a tool change is performed at the at least one tool spindle. In that case, in the machining procedure a workpiece can be machined in various ways. The tool provision operations must ensure that the tool that is needed for the next machining operation is ready.

In one embodiment, a simulation stage is provided in which the durations of machining operations and/or tool provision operations are calculated and/or predetermined in the determination stage. In the simulation stage, an optimized grouping of the tool provision operations in the machining procedure is then calculated and the sequence which is accordingly fixed is then used for the machining procedures.

In particular, durations are calculated and/or predetermined from a work sequence table for machining operations, a configuration table for the tools to be used and a table for a storage device assignment. In the work sequence table, the machining operations are listed in the temporal sequence with the tool to be respectively used. In the table for the storage device assignment, there is a list of the positions at which corresponding tools are located. It is then possible to determine how long it will take for a tool in particular in the first storage device to be moved from its current position to a position of transfer to the second storage device.

It is very particularly advantageous if an observation stage is provided in which the durations are measured by observing the actual operations. As a result it is possible to determine, even during a machining procedure and in particular continuously, what the durations are at the present moment. As a result, the optimization may to a certain extent be adapted in situ. It is also possible to carry out a regrouping during a machining procedure if necessary. This makes it possible to adapt to parameter changes. For example, in practice it may happen that a machining procedure takes longer than originally expected. A self-learning system can thus be realised which is always operated in an optimized manner as regards the duration of the machining procedure.

In that case, it is particularly favorable if the observation takes place in real time, so that accordingly changes that occur can be detected immediately.

It is favorable if the observation stage includes a unit which is coupled to a control of the machine tool for the machining procedure. This makes it possible to realize in a simple manner a real-time determination of the corresponding durations.

It is further favorable if, during a machining procedure and triggered by the observation stage, where necessary one or more changes as regards tool provision operations are performed in the control stage. This makes it possible to carry out where appropriate a regrouping of a machining procedure in a manner adapted to the conditions actually present, in order to minimize the duration of the machining procedure.

In particular, the change or changes are then performed such that the temporal positioning of one or more tool provision operations in the sequence of tool provision operations is changed. Here, it is fundamental that there is no change in the sequence in which the tools appear. The change in sequence is performed such that the grouping of tool provision operations for particular machining operations can be changed.

In one embodiment, a period for positioning a tool at the first storage device for transfer to the second storage device, and a transfer period for the transfer, are determined in the determination stage, wherein the total of these periods is a duration of a tool provision operation, and a check is made on how this duration relates to the duration of a machining procedure. Conventionally, the transfer period may be assumed to be a fixed period. Depending on the result of this check, appropriate data is then generated to carry out a regrouping.

In particular, if the duration of the machining procedure is greater than or equal to the duration of the tool provision operation, then an instruction for tool provision is generated in the control stage. Regrouping is then carried out.

If the duration of the machining procedure is shorter than the duration of tool provision and greater than the positioning period, the control stage generates an instruction for pre-positioning the first storage device. This also allows time optimization to be achieved. If the check gives the result that the two conditions mentioned are not fulfilled, there is a move to the next machining procedure and the corresponding checks are then carried out for the corresponding tool provisions for subsequent machining operations.

Here, there is in particular a check on whether, during an interval of a machining operation in which an instruction for a tool provision operation has been issued, instructions for one or more further tool provision operations are still issuable. As a result of this, it is possible where appropriate for a plurality of tool provision operations to be carried out during one interval of a machining operation. In that case, it is possible for example in respect of the duration to use long machining operations to carry out a plurality of tool provision operations. As a result, in turn, it is possible for example to leave machining operations of relatively short duration unused for tool provision operations in order to minimize or eliminate corresponding idle times.

In one embodiment, the machining procedure is carried out at least once without engaging the control stage, and the durations are determined. On the basis of these determined values, optimization is then possible, where appropriate with regrouping. However, it is in principle also possible for the corresponding durations to be determined for example directly from the control of the machine tool, and then for regrouping to be performed on the basis of this data.

It is favorable in this case if periods are then calculated for the provision of a tool and the calculated periods for the provision of a tool are used, where appropriate with regrouping.

In particular, the method according to the invention is integrated within a control device of the machine tool, wherein instructions for the provision of a tool are in particular generated in the control stage. The method according to the invention then preferably provides the data which enables a machining procedure that is optimized in respect of its duration. This data is then used by the control device actually to optimize the machining procedure, in that in particular a corresponding control of the first storage device and the second storage device is then performed.

The first storage device is in particular a background magazine for the second storage device. Preferably, the first storage device includes a multiplicity of positions (for example more than 60). The number of positions of the second storage device is small by comparison with the number of positions of the first storage device. The second storage device may for example include a chain magazine or one or more rotary disc-type stores.

It is favorable if the second storage device includes one magazine per tool spindle. This results in tool exchange which is optimized in terms of time.

In one embodiment, the second storage device includes at least one (rotary) disc-type store or a chain magazine.

According to the invention, a machine tool of the type mentioned in the introduction which includes a control device for controlling machining operations at the machine tool is provided, wherein the control device includes a tool change unit by means of which the method according to the invention is performable or is performed.

The machine tool has the advantages which have already been explained in conjunction with the method according to the invention.

In an exemplary embodiment, the first storage device is arranged on the machine frame. As a result, in particular a period for tools to be transferred from the first storage device and the second storage device may be minimized.

It is favorable if the first storage device has a plurality of movable storage positions and in particular includes a circulating conveying device. As a result, a large number of tools may be stored at the first storage device and, accordingly in a simple manner, a tool at a transfer position may arrive from the first storage device at the second storage device, or at the second storage device from the first storage device.

The description below of preferred embodiments, together with the drawings, will serve to further explain the invention.

BRIEF DESCRIPTION OF THE DRAWINGS

FIG. 8 shows a schematic illustration of an example of a sequence of a machining procedure; and FIG. 9 shows an example of a sequence obtained from the sequence according to FIG. 8 after carrying out an example of the method according to the invention.

DETAILED DESCRIPTION OF THE INVENTION

Figure 1:
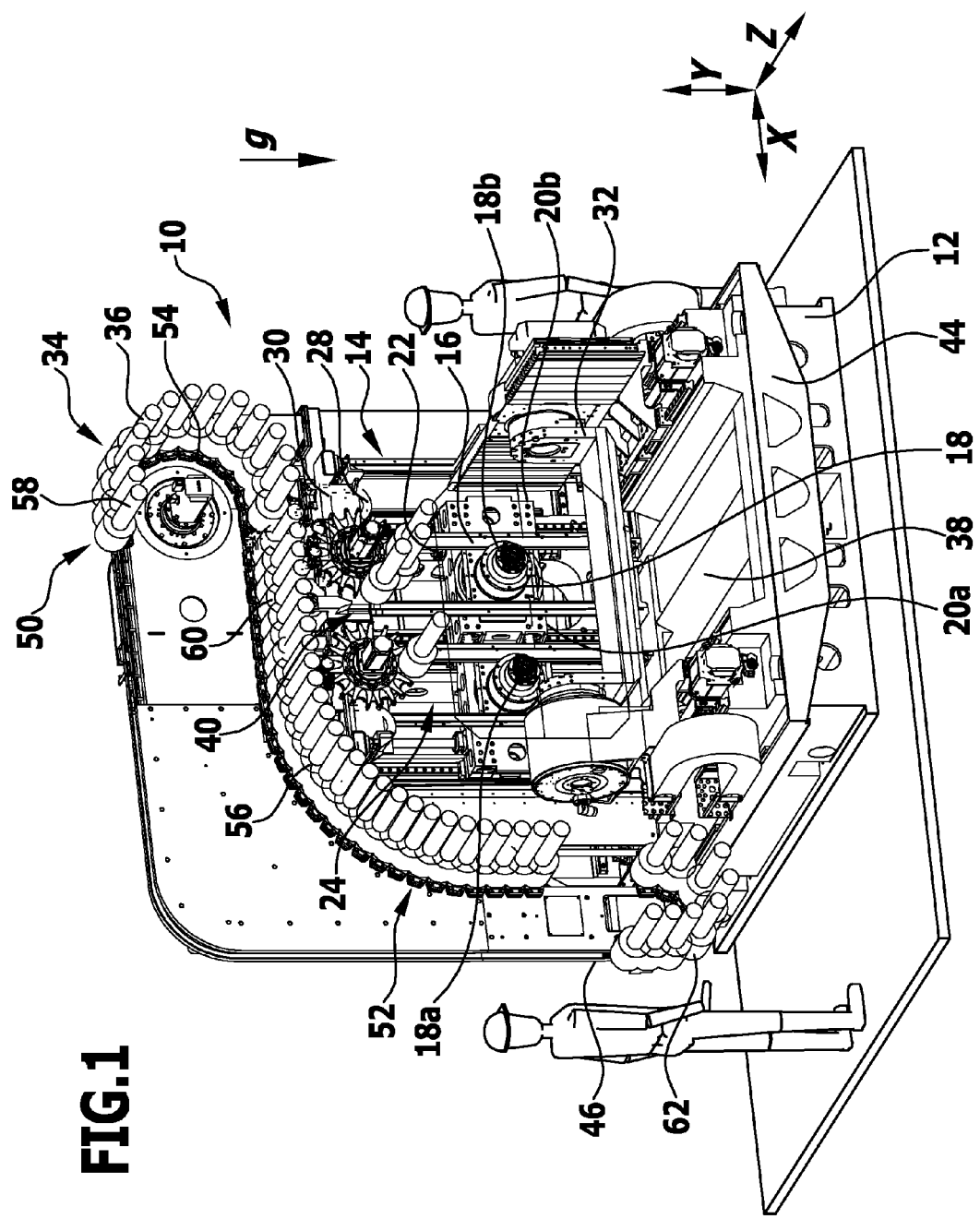
FIG. 1 shows a perspective partial illustration of an exemplary embodiment of a machine tool according to the invention (without cladding, and with partial illustration of a storage device), wherein tools are indicated by way of an interfering contour.
Figure 2:
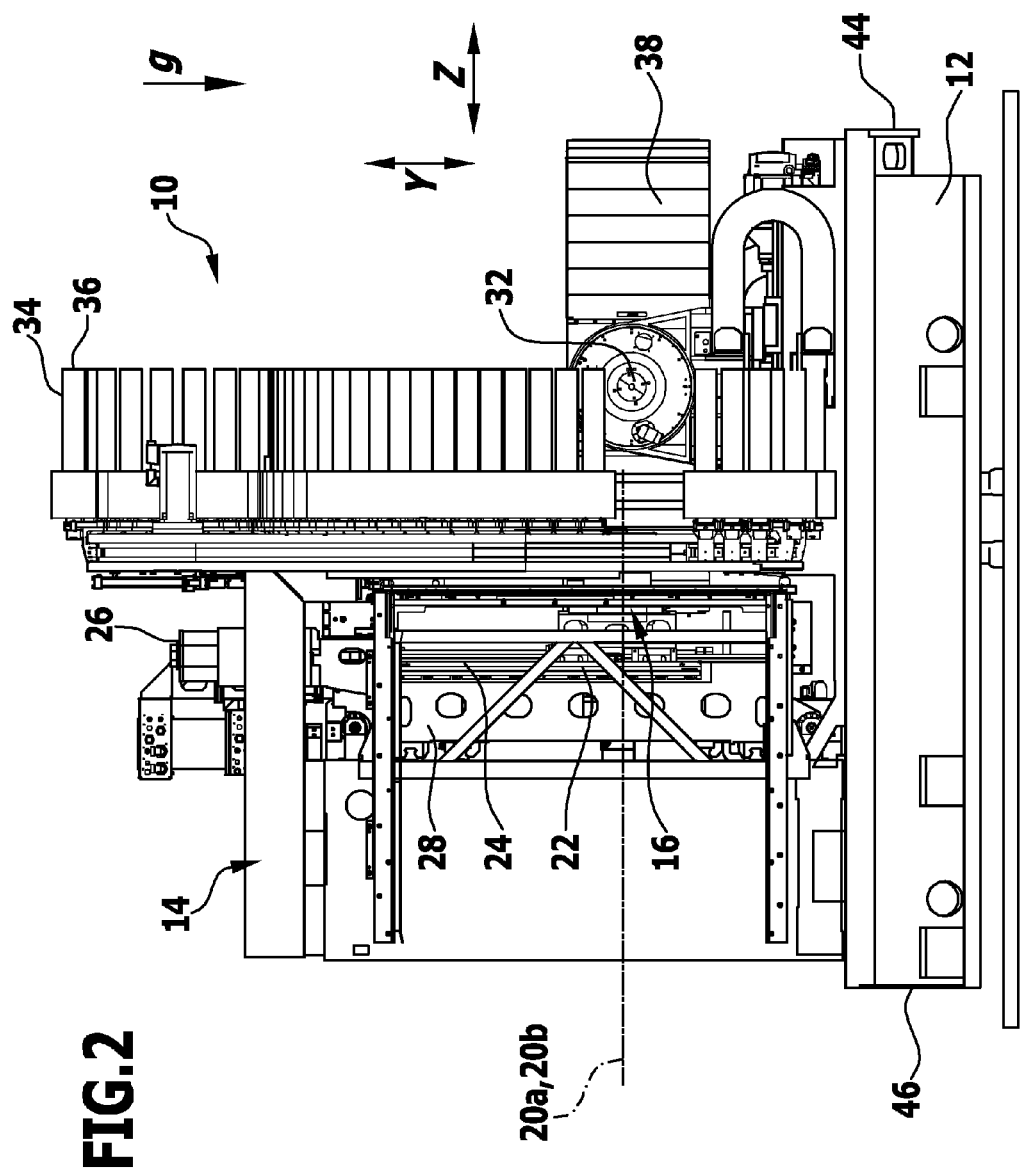
FIG. 2 shows the machine tool according to FIG. 1 in a side view.
Figure 3:
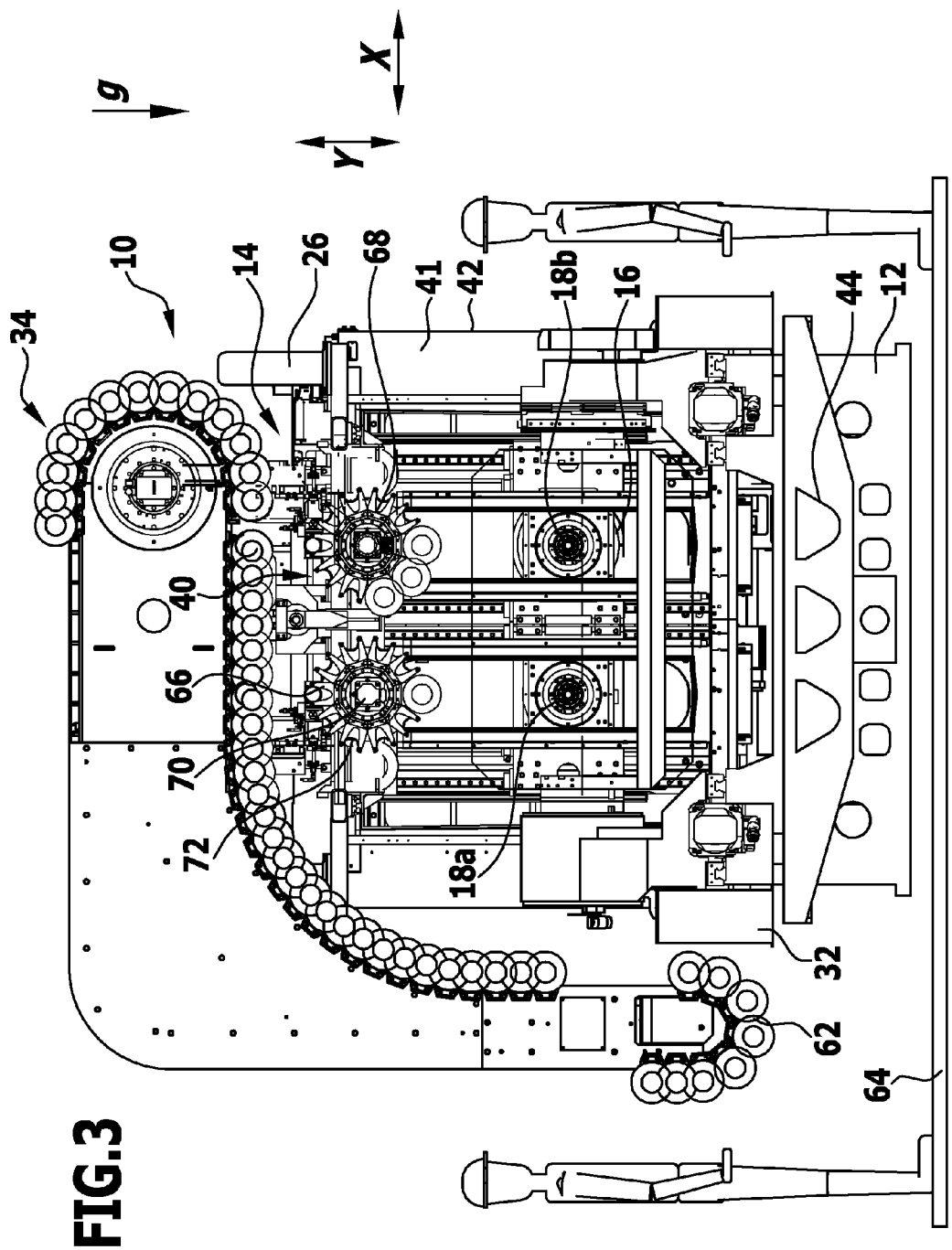
FIG. 3 shows the machine tool according to FIG. 1 in a front view.
Figure 4:
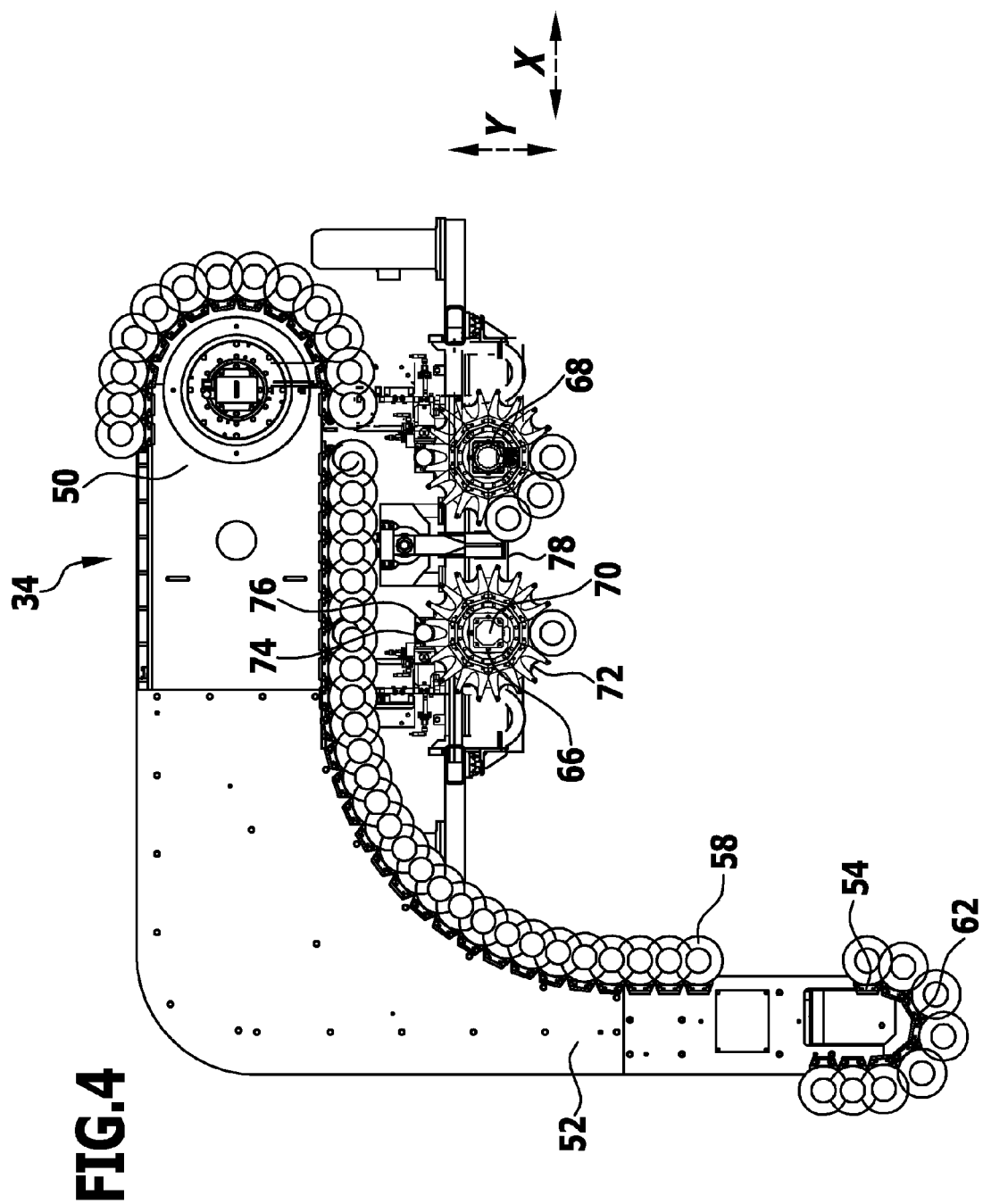
FIG. 4 shows an exemplary embodiment of a storage device (first magazine) having storage discs (second magazine) in the case of the machine tool according to FIG. 1.
Figure 5:
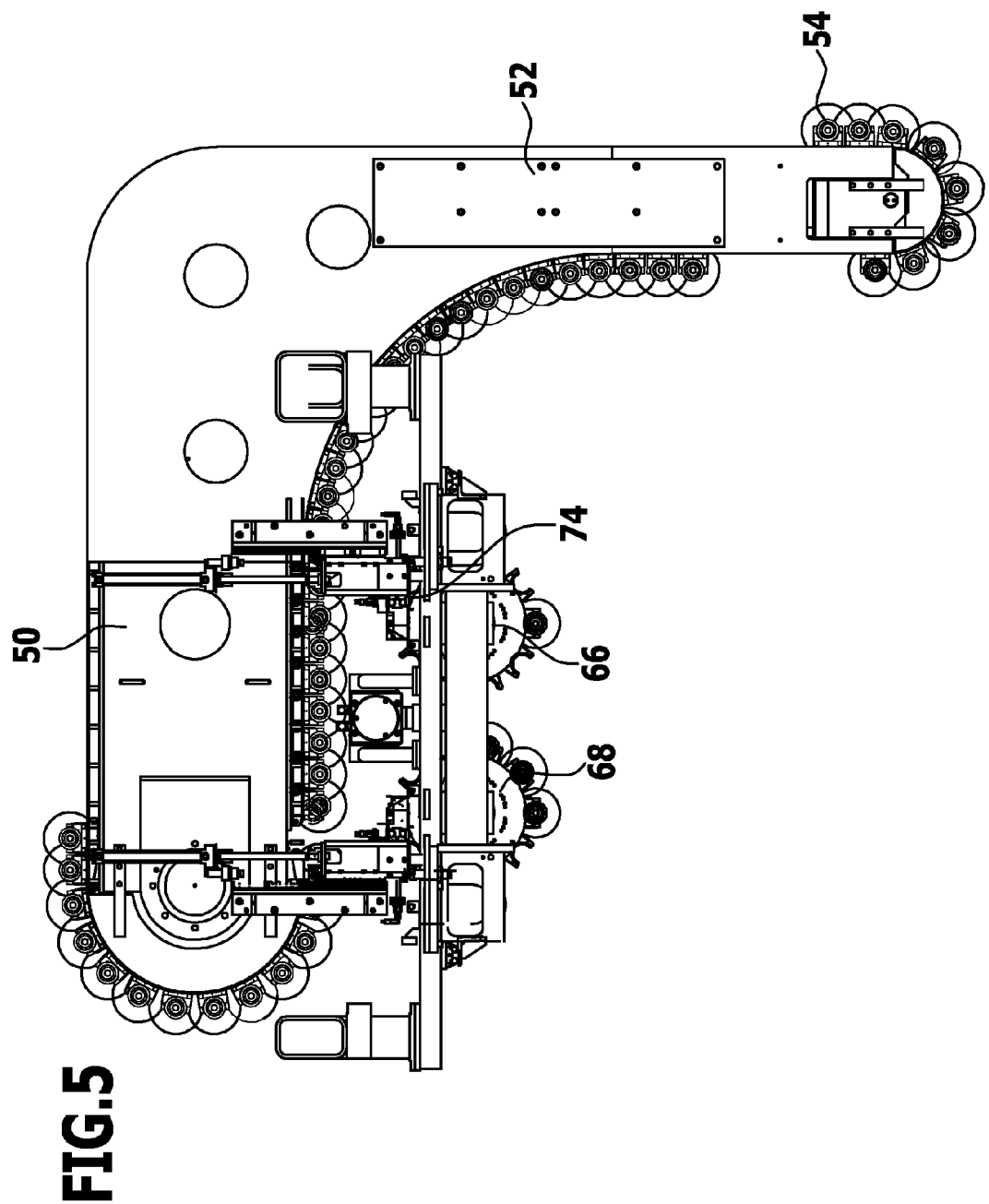
FIG. 5 shows a view of the storage system according to FIG. 4, from a different side.

An exemplary embodiment of a machine tool is a machining center. An embodiment of a machining center, which is shown schematically in FIGS. 1 to 3 as a partial illustration (without cladding) and is designated 10 there, includes a machine bed 12 on which a machine frame 14 is arranged. The machine frame 14 is in a form resembling a gantry and projects beyond the machine bed 12 in a direction that is vertical in respect of the direction of gravity g. A tool holding device 16 is held on the machine frame 14 and includes at least one tool spindle 18.

In the exemplary embodiment shown, the tool holding device 16 includes a first tool spindle 18a and a second tool spindle 18b. A tool which is held on the respective tool spindles 18a, 18b is rotatable about an axis of rotation 20a, 20b. The axes of rotation 20a, 20b lie parallel to one another. They are oriented parallel to a Z direction which, in the illustration according to FIG. 3, lies perpendicular to the plane of the drawing. In particular, the Z direction is a horizontal direction in respect of the direction of gravity g.

The tool holding device 16 takes the form of a slide 22 which is held on a slide guide 24 and is linearly movable by way of the slide guide 24 in a Y direction (sense and opposed sense). The Y direction is transverse to, and in particular perpendicular to, the Z direction. In respect of the direction of gravity g, the Y direction is in particular a vertical direction.

A driving device 26 is associated with the slide 22, for driving movement of the slide 22 in the Y direction and for positioning thereof. This driving device 26 may for example include a ball screw drive or a linear motor.

The slide 22 is itself held on a slide 28 which is linearly displaceable in an X direction (sense and opposed sense) on a slide guide 30. For displacement and positioning, a corresponding drive is provided. The X direction is transverse to, and in particular perpendicular to, the Y direction and the Z direction. In respect of the direction of gravity g, the X direction is in particular a horizontal direction.

Arranged on the machine bed 12 is a (at least one) workpiece holder 32. The first tool spindle 18a and the second tool spindle 18b and hence tools that are held thereon and the workpiece holder 32 are movable relative to one another in the Z direction (sense and opposed sense). A workpiece, which is held at the workpiece holder 32, and the tool spindle 18a or 18b are thus displaceable relative to one another in the X direction as the first direction, the Y direction as the second direction, and the Z direction as the third direction.

In an exemplary embodiment, for machining a workpiece the tool spindles 18a, 18b are not movable in the Z direction, and the workpiece holder 32 is held displaceably in the Z direction, on the machine bed. For this purpose, a drive is associated with the workpiece holder 32.

In an alternative exemplary embodiment, the first tool spindle 18a and the second tool spindle 18b are held displaceably on the tool holding device 16 in order to enable Z displaceability.

It is also possible to combine Z displaceability of the tool spindles 18a, 18b on the tool holding device 16 and Z displaceability of the workpiece holder 32 on the machine bed.

It may also be provided for example for the workpiece holder 32 to be rotatable about a for example vertical and/or horizontal axis.

A corresponding machining center is described for example in WO 2009/033920 A1. Reference is made to this published specification, and this published specification is part of the disclosure.

In the exemplary embodiment shown, the machining center 10 has a first storage device 34 for tools 36, which is arranged with a partial region above a workspace 38 in which workpieces are machined. The tools 36 are indicated by way of their interfering contour (maximum external dimensions).

Further, a tool changing device 40 is provided, by way of which tools 36 are placeable on the tool spindles 18a and 18b and removable therefrom.

The machining center 10 may also include only a single tool spindle, or may include more than two tool spindles.

The machining center 10 has a control device 41 which is arranged at least partly in a switch cabinet 42. Sequences of workpiece machining may be controlled by way of the control device 41.

The machining center 10 has a front side 44 and a rear side 46. The workspace 38 faces the front side 44.

The first storage device 34 is part of a storage system 48. The storage system 34, which is arranged on the machine frame 14, includes a first region 50 which is arranged above the workspace 38. Further, the storage device 34 includes a second region 52 which is arranged laterally next to the workspace. The storage device 34 is of a shape which is L-shaped in plan view. It includes a circulating conveying device 54 which in particular takes the form of a chain conveyor. Arranged on the circulating conveying device 54 are storage positions 56, wherein each storage position 56 may receive one tool 58. A storage position 56 has a corresponding interface for example for an HSK receptacle. As a result of the circulating conveying device 54, the storage positions 56 and hence also tools 58 can be transported in a closed circuit. As a result of this, tools 58 can be provided to the tool spindles 18a, 18b in a region 60 above (in respect of the direction of gravity g) the workspace 38.

On an underside 62, the second region 52 of the first storage device 34 is at a spacing from a base 64 (cf. in particular FIG. 3) which is at most 1.5 m. As a result, an operator can load and unload the storage device 34 in the vicinity of the underside 62; that is to say, tools may be exchanged there, in particular manually. It is for example also possible for a separate tool loading/unloading station to be associated with the second region 52, as a result of which the storage device 34 is loadable and unloadable automatically.

The storage device 34 forms a first magazine for tools for the machine tool 10. It has a multiplicity of storage positions 56. In particular, it has more than thirty storage positions. In an exemplary embodiment, the first storage device 34 has ninety-two storage positions 56.

The storage system 48 further includes, as the second storage device 67, a first disc-type store 66 and a second disc-type store 68. The first disc-type store 66 is associated with the first tool spindle 18a and the second disc-type store 68 is associated with the second tool spindle 18b.

The disc-type stores 66, 68 are arranged on the machine frame 14, in each case rotatably about an axis 70. The axis of rotation 70 is in this case aligned parallel to the Z direction.

The first disc-type store 66 and the second disc-type store 68 are spaced from one another in the X direction. This spacing between the first disc-type store 66 and the second disc-type store 68 is in particular fixed.

The first disc-type store 66 and the second disc-type store 68 are arranged between the workspace 38 and the first region 50 of the storage device 34. They are in particular positioned below the first region 50 of the storage device 34 and above the workspace 38. The first disc-type store 66 and the second disc-type store 68 are each in communication with the storage device 34 (to be precise, with the first region 50 there) and with the associated tool spindle 18a and 18b respectively.

A disc-type store 66 or 68 has a plurality of storage positions 72 which are arranged on a circular disc. A storage position 72 includes for example an HSK interface. In this arrangement, the storage positions 72 are distributed around the periphery of the respective disc-type store 66 or 68 in such a way that a tool stored in a storage position 72 may be removed from the outside.

The disc-type stores 66 and 68 form a second magazine (buffer magazine) for tools, wherein the number of storage positions 72 of the first disc-type store 66 and of the second disc-type store 68 is in each case smaller than the number of storage positions 56 of the storage device 34. For example, the number of storage positions 72 of the first disc-type store 66 and the second disc-type store 68 is in each case ten.

In particular, the first disc-type store 66 and the second disc-type store 68 each take the same form.

There is provided a (at least one) transfer station 74, which serves to transfer tools between the storage device 34 and the respective disc-type store 66, 68. The transfer station 74 here includes at least one position 76 for a tool. By way of this position 76, a tool may be received on the corresponding disc-type store 66, 68 and transported to the storage device 34 (to the first region 50 there), and conversely a tool may be taken from the storage device 34 and then transported to the corresponding disc-type store 66 or 68.

In an exemplary embodiment, the transfer station 74 includes two positions 76, with the result that two tools may be received at the same time.

The transfer station 74 is set up to be movable in order to enable transfer between the storage device 34 and the respective disc-type store 66, 68.

The transfer station 74 includes for example a slide for linear movement between the first region 50 of the storage device 34 and the corresponding disc-type store 66, 68, or for example a pivotal element.

In particular, a separate transfer station 74 is associated with each of the first disc-type store 66 and the second disc-type store 68.

In principle, it is also possible for the first disc-type store 66 and the second disc-type store 68 to be arranged on a slide which is movable on the machine frame 14. This slide is for example movable in the Y direction or the X direction, or in the Y direction and the X direction.

A transfer device may be formed by way of a slide of this kind. In that case, by moving the slide, the disc-type stores 66, 68 may be moved into the vicinity of the first region 50 of the storage device in order to enable direct transfer.

It is also possible, even if transfer stations 74 are provided, for the first disc-type store 66 and the second disc-type store 68 to be arranged on a slide 78 which is movable in the X direction and/or the Y direction and/or the Z direction. As a result, the slide may, together with the disc-type store 66 and the second disc-type store 68, be fed to the tool spindles 18a, 18b.

As an alternative, for tool exchange, it is also possible for the tool spindles 18a, 18b to be moved to the disc-type stores 66, 68 such that tool exchange is made possible.

It may for example also be provided for the slide 78 to have movability only in the Z direction. The Z direction is parallel to a direction in which the tool spindles 18a, 18b extend longitudinally. As a result of appropriate displaceability of the slide 78 in the Z direction, a lifting-out movement for a tool may be achieved.

For tool change, the machine tool operates as follows.

The first storage device 34 forms a background magazine (first magazine) for tools. The disc-type stores 66, 68—wherein in each case one disc-type store is associated with one tool spindle (the first disc-type store 66 is associated with the first tool spindle 18a and the second disc-type store 68 is associated with the second tool spindle 18b)—enable a buffer store for tools to be formed, wherein the transfer station or stations 74 provide for the transfer of tools between the storage device 34 and the disc-type stores 66, 68. The tool spindles 18a, 18b collect tools from and deliver tools to the disc-type stores 66, 68. (The delivery procedure and collection procedure may in this case be carried out actively by the tool spindles 18a, 18b, in that the latter approach the disc-type stores 66, 68, or in principle a passive procedure is possible in that, if the disc-type stores 66, 68 are arranged on the slide 78, the slide 78 approaches the tool spindles 18a, 18b. A combined active approach of both the tool spindles 18a, 18b and the slide 78 is also possible.)

The respective disc-type stores 66, 68 receive a smaller number of tools than the storage device 34.

In principle, the storage system 48 having the background magazine (the storage device 34) has a capacity for receiving tools which is larger by the amount of the buffer store (the first disc-type store 66 and the second disc-type store 68). Since a relatively large number of tools can be kept in reserve in the disc-type stores 66, 68 and these are located directly at the edge of the workspace 38, a brief provision period for tools for the tool spindles 18a, 18b can be realised even with relatively complex machining operations in which a plurality of tools are required. In this case, a short chip-to-chip time of for example less than 3 seconds is produced.

As a result of the background magazine 34, it is also possible to carry out tool exchange on the disc-type stores 66, 68 simply and rapidly.

Since a disc-type store 66 or 68—and in particular one disc-type store 66 or 68—is associated with each tool spindle 18a, 18b, rapid tool change can also be provided even if tool change is to take place on a plurality of tool spindles and in particular synchronously. In particular, this enables synchronous machining procedures to be carried out on two workpieces within the same machine tools with short chip-to-chip times.

A corresponding machine tool is described in international application PCT/EP2012/067368, dated 6 Sep. 2012, to which reference is expressly made. A further machine tool, in which the second storage device is a chain-type storage device, is described in international application PCT/EP2012/067310, dated 5 Sep. 2012, to which reference is expressly made.

Figure 6:
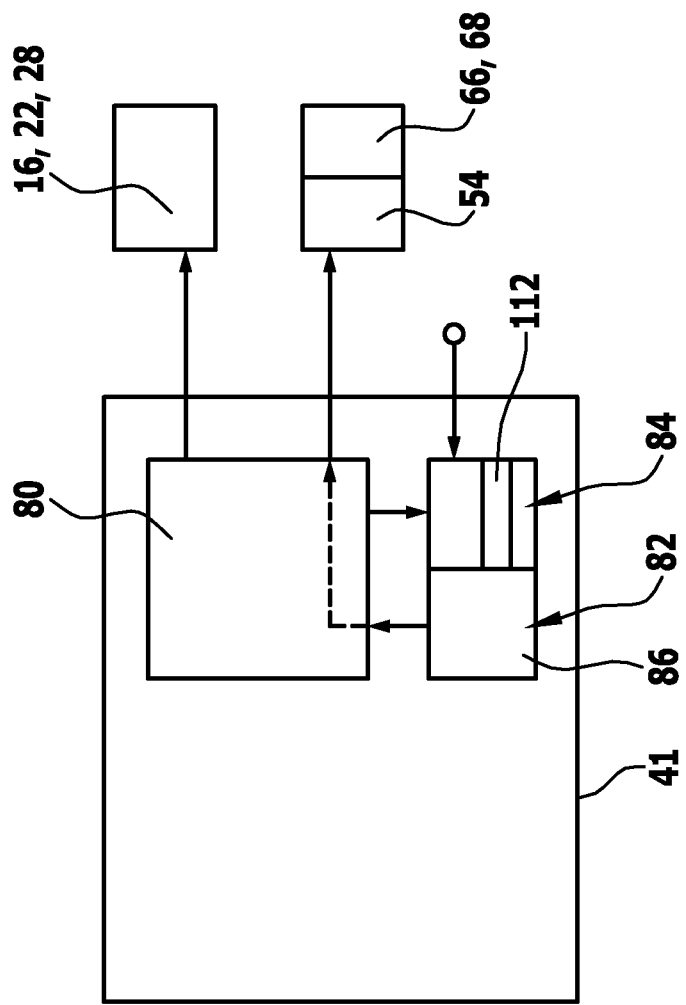
FIG. 6 shows a schematic block diagram of a control device of an exemplary embodiment of a machine tool according to the invention.

The control device (FIG. 6) includes a control 80 for controlling the movement sequences of a machining procedure on a workpiece. In this case, the control 80 in particular controls the tool holding device 16, the slides 22, 28, etc. Further, it controls the first storage device 54 and the second storage device 66, 68.

The control device 41 further includes a tool change unit 82. The tool change unit 82 serves, as will be described below in more detail, to provide data to the control 80 by means of which these tool provision operations are controlled.

In an exemplary embodiment, the tool change unit 82 includes a determination stage 84 and a control stage 86. The determination stage 84 determines data for a machining procedure, and once this data has been analyzed the control stage 86 provides data to the control 80 for direct control of the first storage device 34 and the second storage device 67.

In FIG. 8, a machining procedure 88 for a workpiece on the machine tool 10 is shown schematically in its temporal sequence. This machining procedure 88 includes a sequence 90 of machining operations 92a, 92b, etc. The respective machining operations are machining operations in the machine tool 10 on a workpiece. Different machining operations are for example carried out using different tools. Between adjacent machining operations 92a, 92b, etc., the sequence 90 includes respective tool change operations 94a, 94b, etc. During a corresponding tool change procedure 94a, the tool required for the next machining operation is exchanged from the second storage device 67, after removal of the tool that was used for the preceding machining operation at the tool spindle 18a or 18b, to this tool spindle 18a or 18b.

The machining procedure 88 also includes a workpiece change operation 96, which is at the start of the sequence 90. During this workpiece change operation 96, a workpiece is loaded into the workpiece holder 92.

The sequence 90 has a particular duration for a particular workpiece, composed of the total of corresponding durations of the individual machining operations 92a, etc., the workpiece change operation 96 and the individual tool change operations 94a, etc.

So that the different machining operations 92a, etc. can be carried out, at the start of each machining operation the tool that is respectively needed must be put into the tool spindle 18a or 18b. For this purpose, the appropriate tool from the first storage device 34 must be provided to the second storage device 67 so that, during the tool change operation 94a, etc., the tool that is needed for the next machining operation is available.

Associated with the sequence 90 is a sequence 98 for tool provision operations 100a, 100b, etc. by the storage devices 34 and 67. Each machining operation 92a, 92b, etc. is performed using a particular tool. Before the machining operation, this particular tool must be exchanged to the corresponding tool spindle 18a, 18b. Before the exchange, this particular tool must in turn be provided; that is to say that it must be transferred from the first storage device 34 to the second storage device 67 so that an exchange operation can take place at all.

A tool is transferred from the first storage device 34 to the second storage device 67 at a particular transfer position. This transfer position is reached by moving this particular tool with the first storage device (and where appropriate by a movement of the second storage device). Starting from a particular position of a particular tool of this kind in the first storage device, a certain positioning period $t_1$ is needed to move this particular tool from its current position to the position of transfer to the second storage device. The transfer itself takes a period $t_2$.

A period for providing a tool is accordingly $t_b=t_1+t_2$. This period $t_b$ may be different for different tools, in particular depending on the position of a given tool in the first storage device and the period then needed to move it to the transfer position. The period $t_2$ may be regarded as at least approximately constant.

The sequence 98 is set up such that the appropriate tool is provided before a tool change operation 94a, etc.

Here, it may happen—as indicated in FIG. 8 by the reference numerals 102a, b, c—that a tool provision operation (in the example, the tool provision operation 100d, 100e and 100f) takes longer than the currently performed machining operation, that is to say the machining operation before the next machining operation needing the tool provided. As a result, idle times 102a, 102b, 102c occur in the sequence 90 of the machining procedure 88; that is to say that the tool provision operations increase the duration of the machining procedure 88.

Figure 7:
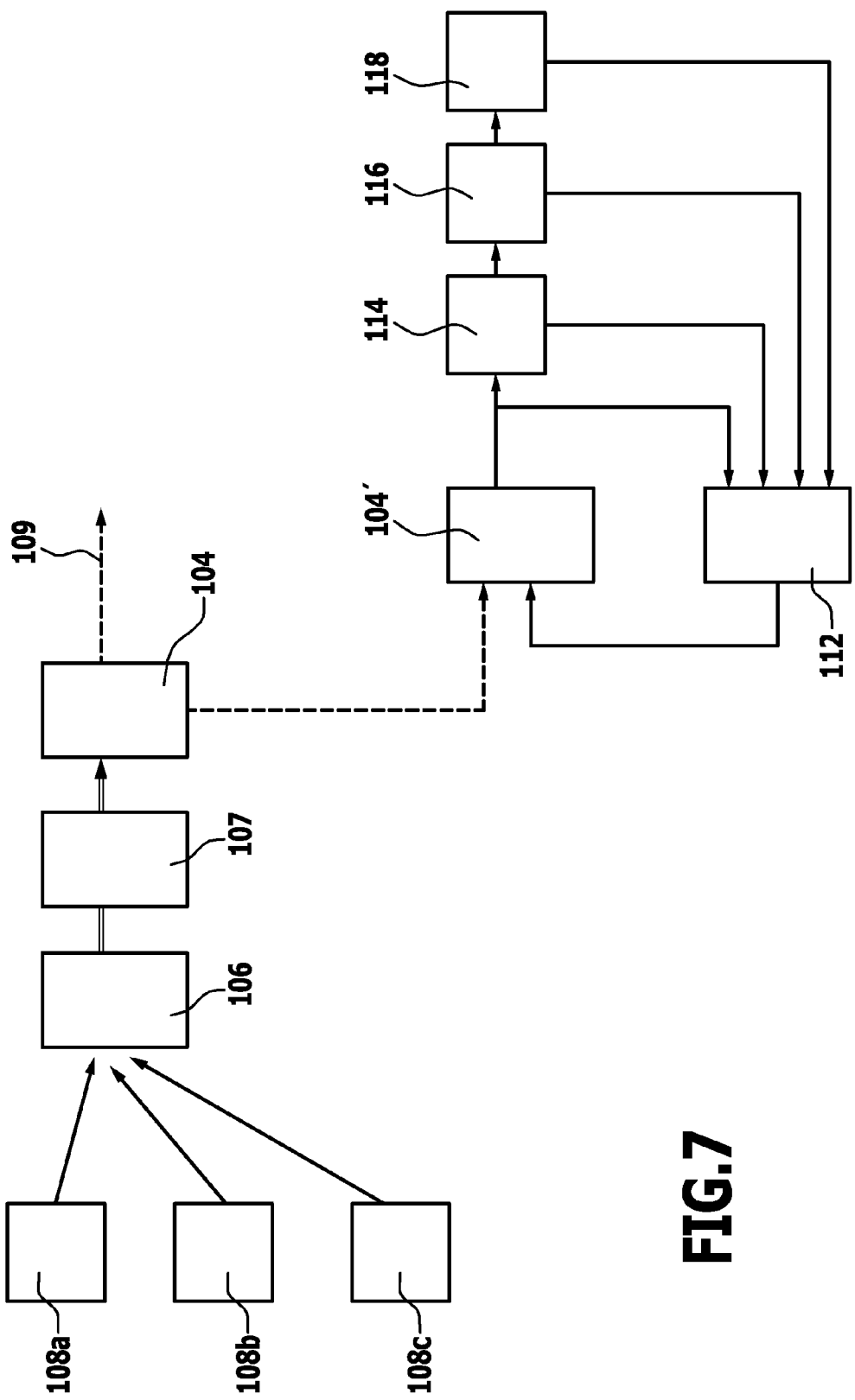
FIG. 7 shows a schematic illustration of steps for drawing up and using a table for tool provision.

The sequence 98 for tool provision operations is stored in a tool provision table 104 or 104' (cf. FIG. 7). The tool provision table 104 is a static tool provision table in which the stored data is not variable over time. The tool provision table 104' is a dynamic tool provision table in which the stored data can change over time. This will be explained further below. The actual tool provision is performed on the basis of the data in the tool provision tables 104 and 104', which are provided by the control stage 86 to the control 80.

According to the invention, a method is provided in which idle times can be reduced and, in the most favorable case, eliminated, with the result that the duration of the machining procedure 88—that is, the length of the sequence 90—is independent of tool provision operations 100a, etc.

During the machining procedure 88 with an actual work sequence, the determination stage 84 determines the periods of the machining operations 92a, 92b, etc. and the duration of the workpiece change operation 96. Furthermore, it determines the durations of the tool provision operations 100a, 100b, etc.

In the flow diagram according to FIG. 7, the determination operation is indicated schematically by the reference numeral 106. Here there are input a work sequence 108a in the machining procedure 88, for example from a work sequence table, an allocation 108b of the background magazine 34a which is determined by the durations of workpiece change operations 96, and actual machining periods 108c of the machining operations 92a, etc.

This determination may be performed in various ways.

In one embodiment, on the basis of the data present an offline simulation is performed, or a calculation is performed and from this there results the static tool provision table 104.

It is also possible to carry out an online determination at the machine tool 10. For this purpose, the machining procedure 88 (parts program) is run through, and is in particular run through once, without being affected by the tool change unit 82. In this case, the order of the tools and the machining periods is documented by a corresponding program in the control 80 or in the tool change unit 82, and the corresponding data is stored.

Optimization is then carried out by the method according to the invention in the control stage 86. This operation is indicated in FIG. 7 by the reference numeral 107.

In the method according to the invention which is carried out in the control stage 86, the tool provision operations are now regrouped if necessary such that idle times 102, etc. are minimized and in particular eliminated. The result is the static tool provision table 104.

Here, tool provision operations are regrouped in the sequence 98 in association with the sequence 90 such that tool provision operations are performed as far as possible within machining operations 92a, etc. and an interval of a tool provision operation 100a, etc. does not go beyond the end of a machining operation 92a, etc. or a workpiece change operation 96, specifically so that the machining procedure 88 does not become any longer. The period of tool provision operations 100a, etc. then falls entirely within the interval of the workpiece change operation 96 or the corresponding machining operations 92a, 92b, etc. However, tool provision operations 100a, etc. must of course also be performed here such that the tool needed is provided for the respective machining operation.

In an exemplary embodiment, a positioning period $t_1$, which corresponds to the time needed to put a particular tool in the first storage device 34 (background magazine) in the transfer position, is determined for all the relevant steps in the sequence 90 of the tool change unit 92. For this purpose, a position number of the required tool in the first storage device is for example determined, as is an actual position of the first storage device. The positioning period $t_1$ is then predetermined as a function of the speed of the first storage device, which in particular includes a chain.

The transfer period $t_2$ between the first storage device and the second storage device is for example set as a fixed value.

The period for provision $t_b=t_1+t_2$ is then checked in relation to the duration T of the machining operation 92a, etc. If this check shows that $T \geq t_b$, an instruction for tool provision is generated. This instruction is then passed on by the control stage 86 to the control 80. If $T \leq t_b$ and $T > t_1$, an instruction for pre-positioning the tool at the first storage device is issued.

In the case of the workpiece change operation 96, the time available is a workpiece loading time $T_W$. For most cases, the workpiece loading time $T_W$ may be assumed to be fixed. The same check as above is carried out.

In principle, it is possible for a plurality of tool provision operations 100a, 100b to take place during a workpiece change operation 96 and/or a machining operation 92a, etc., as a function of the corresponding periods $T_W$ and T. If there is still time, in particular after a tool has been provided, for providing the replacement tool, then the next instruction for tool provision will be set up by the control stage 96.

For example, after a corresponding tool provision has been associated with a workpiece change operation 96 or a machining operation 92a, etc., a check is carried out of whether the time difference between the end of the corresponding machining operation (for example 92a) and the end of the first tool provision operation (for example 100a) is still sufficient for a further tool provision operation. If there is sufficient time, a subsequent tool provision operation is carried out, wherein in particular the tool may be pre-positioned at the first storage device.

If this time is not available, there is a move on to the machining operation which is next in the temporal sequence 90, and the corresponding requirements are carried out.

FIG. 9 shows the result of a corresponding sequence 110 for tool provision operations. The sequence for machining operations corresponds to the sequence 88. In FIG. 9, however, it is given the reference numeral 88', since the method according to the invention has been used to eliminate idle times 102a, 102b, 102c. This sequence 88' is stored in the tool provision table 104.

In the exemplary embodiment according to FIGS. 8 and 9, the corresponding checks and calculations carried out in the control stage were used to group the tool provision operations 100a, 100b in the interval of workpiece change 96. The tool provision operations 100c, 100d, 100e were positioned in the machining operation 92a. The tool provision operations 100f and 100g were regrouped into the machining operation 92b. As a result, during the machining operations 92c, 92e, which are of short duration, there is no longer any need to provide tool provision operations and the idle times 102a, 102b, 102c are eliminated.

The results—that is in particular the sequence 88' and 110—are then transferred from the control stage 86 to the control 80. In FIG. 8 this is indicated by the arrow 109. During an actual machining procedure, the corresponding parts of the machine tool 10 are then controlled such that the sequence presented in FIG. 9 results.

In principle, the sequences 88, 90 and then 88' and 110 are dependent on the workpiece used. The corresponding determinations and calculations have consequently to be carried out for each workpiece type.

In an embodiment, in principle the sequence 110 and the resulting sequence 88' are determined once. This is then a type of simulation. These determined sequences are then used in fixed manner to control the machine tool 10.

In an advantageous embodiment, the tool change unit 82 includes an observation stage 112 (FIG. 7). The observation stage 112 determines the corresponding durations in the sequences of the machining operations (including workpiece change operation 96) and tool provision operations, even during the actual machining of a workpiece. In particular, determination is performed in real time.

This is indicated in FIG. 7. On the basis of a tool provision table 104, the actual machining at the machine tool 10 is controlled. For this purpose a corresponding tool provision 114 is performed and corresponding settings 116 at the machine tool 10 and an actual procedure 118 are carried out. The observation stage 112 observes these actions and contains a corresponding feedback. The observation stage 112 analyses the reports and triggers a modification to the data in the tool provision table 104 where necessary; that is to say the sequence 88' is modified. If such an observation stage 112 is provided, this then becomes a dynamic tool provision table 104' in which the times of the corresponding table data can be changed as a function of the operations 114, 116, 118.

The dynamic tool provision table 104' is produced, for example from the static tool provision table 104 which was determined in the step 106, from the influence of the observation stage 112.

For this purpose, the observation stage 112 is coupled to the control 80 and contains the appropriate data in order to determine the corresponding durations in situ.

On the basis of the durations actually present, the optimizations are then carried out, again during the machining procedure. In particular, during the machining procedure sequences 88' and 110 are constantly recalculated, and if a new grouping is required this is carried out and the corresponding instructions determined by way of the control stage 86 and the control 80.

As a result, a self-learning system which also enables regrouping during the machining procedure is provided.

In principle, during workpiece machining, parameters relating to machining operations, workpiece change operations and tool provision operations may change. For example, the speed of the first storage device may change, or particular machining operations may take longer than the duration contained in the static tool provision table 104, etc. As a result of the observation stage 112, optimization and checking may be performed in real time, even during the machining operation, and the data for the tool provision table 104' can be adapted dynamically.

However, it is also possible in principle for the corresponding tool provision to be performed by way of the static tool provision table 104.

LIST OF REFERENCE NUMERALS

10 Machining center
12 Machine bed
14 Machine frame
16 Tool holding device
18a First tool spindle
18b Second tool spindle
20a Axis of rotation
20b Axis of rotation
22 Slide
24 Slide guide
26 Driving device
28 Slide
30 Slide guide
32 Workpiece holder
34 First storage device
36 Tool
38 Workspace
40 Tool changing device
41 Control device
42 Switch cabinet
44 Front side
46 Rear side
48 Storage system
50 First region
52 Second region
54 Circulating conveying device
56 Storage position
58 Tool
60 Region
62 Underside
64 Base
66 First disc-type store
67 Second storage device
68 Second disc-type store
70 Axis
72 Storage position
74 Transfer station
76 Position
78 Slide
80 Control
82 Tool change unit
84 Determination stage
86 Control stage
88 Machining procedure
90 Sequence
92a, b Machining operation 94a, b Tool change operation
96 Workpiece change operation
98 Sequence
100a, b Tool provision operation
102a, b, c Idle time
104 Static tool provision table
104' Dynamic tool provision table
106 Determination operation
107 Optimization
108a Work sequence
108b Allocation of the background magazine
108c Durations of machining operations
109 Transfer
110 Sequence
112 Observation stage
114 Tool provision
116 Settings
118 Procedure

The invention claimed is:

1. A method for controlling tool change operations on a machine tool, wherein the method includes:
    providing the machine tool, which includes:
        a machine frame,
        at least one tool spindle which is arranged on the machine frame and is displaceable relative thereto,
        a first storage device for tools, and
        a second storage device for tools, the second storage device being in communication with the first storage device and the at least one tool spindle;
    establishing a machining procedure on a workpiece, said machining procedure including:
        a workpiece change operation that lasts for a respective duration of time,
        a plurality of machining operations that collectively form a sequence of machining operations, each of the plurality of machining operations using a particular tool for a respective duration of time, and
        a sequence of tool changes, wherein for each tool change, a respective tool is provided by the second storage device to the at least one tool spindle;
    establishing a sequence of tool provision operations, wherein for each tool provision operation of the sequence of tool provision operations, a respective tool is transferred from the first storage device to the second storage device, each tool provision operation lasting for a respective duration of time;
    determining during a determination stage the length of the respective durations of time of the workpiece change operation, each of the plurality of machining operations, and each of the tool provision operations;
    executing during a control stage initial temporal grouping of each of the tool provision operations in relation to the workpiece change operation and, optionally, also in relation to respective machining operations of the plurality of machining operations; and after the initial temporal grouping,
    optimizing the machining procedure such that idle times in which none of the plurality of machining operations or tool changes are occurring, and that resulted from the initial temporal grouping of the tool provision operations in relation to the workpiece change operation and optionally in relation to the respective machining operations, are either minimized or eliminated, wherein optimization of the machining procedure is realized by temporally regrouping each of the tool provision operations such that one or more of the tool provision operations is temporally regrouped so as to occur in a sequence with another of the tool provision operations so that multiple ones of the tool provision operations occur between a start and an end of the duration of time of the workpiece change operation, and, optionally, so that multiple ones of the tool provision operations occur between a respective start and a respective end of one or more of the respective durations of time of the individual machining operations of the plurality of machining operations.

2. The method according to claim 1, wherein a duration of the machining procedure on the workpiece is made up of:
    the duration of the workpiece change operation,
    the durations of each of the plurality of machining operations,
    durations of each of the tool change operations between machining operations, and
    the idle times that resulted from the initial temporal grouping of the tool provision operations.

3. The method according to claim 2, wherein a control objective of the control stage is for the duration of the machining procedure to be or to become independent, with respect to time, of the tool provision operations.

4. The method according to claim 1, wherein the tool provision operations are carried out during the duration of time of the workpiece change operation, and also during the one or more of the respective durations of time of the individual machining operations of the plurality of machining operations.

5. The method according to claim 1, wherein one or more tool provision operations are grouped between the start and the end of the respective durations of time of the individual machining operations of the plurality of machining operations, wherein a control objective is not to go beyond the end of the respective durations of time of the individual machining operations.

6. The method according to claim 1, wherein, in the machining procedure between different machining operations, a tool change is performed at the at least one tool spindle.

7. The method according to claim 1, wherein a simulation stage is provided, in which the durations of time of at least one of (i) the plurality of machining operations and (ii) the tool provision operations are at least one of (i) calculated and (ii) predetermined in the determination stage.

8. The method according to claim 1, wherein the durations of time of the plurality of machining operations and the tool provision observations are at least one of (i) calculated and (ii) predetermined from a work sequence table for the machining operations, and a table for a storage device assignment.

9. The method according to claim 1, wherein an observation stage is provided, in which the durations of time of the plurality of machining operations and the tool provision observations are measured by observing the actual operations.

10. The method according to claim 9, wherein the observation takes place in real time.

11. The method according to claim 9, wherein the observation stage includes a unit which is coupled to a control of the machine tool for the machining procedure.

12. The method according to claim 9, wherein, the temporal regrouping of the sequence of tool provision operations is triggered by the observation stage.

13. The method according to claim 12, wherein the temporally regrouped sequence of tool provision observations is performed in the control stage.

14. The method according to claim 1, wherein a period for positioning (t1) one of the tools of the first storage device for transfer to the second storage device, and a transfer period (t2) for the transfer, are determined in the determination stage, wherein the total of these periods is the respective duration of time of the tool provision operation for the one of the tools of the first storage device, and a check is made on how this respective duration of time relates to a duration of time of the machining procedure.

15. The method according to claim 14, wherein, if the duration of time of the machining procedure is greater than or equal to the respective duration of time of the tool provision operation for the one of the tools of the first storage device, then an instruction for tool provision is generated in the control stage.

16. The method according to claim 14, wherein, if the duration of time of the machining procedure is smaller than the respective duration of time of the tool provision for the one of the tools of the first storage device and greater than the positioning period (t1), the control stage generates an instruction for pre-positioning the first storage device.

17. The method according to claim 14, wherein there is a check on whether, during the respective duration of time of one of the plurality of machining operations in which an instruction for one of the tool provision operations of the sequence of tool provision operations has been issued, instructions for one or more further tool provision operations of the sequence of tool provision operations are still issuable.

18. The method according to claim 1, wherein the machining procedure is carried out at least once without engaging the control stage.

19. The method according to claim 18, wherein the durations of time of the plurality of machining operations and the tool provision observations are determined, and periods are calculated for the provision of one of the tools of the first storage device.

20. The method according to claim 19, wherein the calculated periods for the provision of the one of the tools of the first storage device are used.

21. The method according to claim 1, which is implemented within a control device of the machine tool, wherein instructions for the provision of one of the tools of the first storage device are generated in the control stage.

22. The method according to claim 1, wherein the first storage device is a background magazine for the second storage device.

23. The method according to claim 22, wherein the second storage device includes one magazine per tool spindle.

24. The method according to claim 1, wherein the second storage device includes at least one disc-type store or chain magazine.

25. A machine tool, comprising:
a machine frame;
at least one tool spindle which is arranged on the machine frame and is displaceable relative thereto;
a first storage device for tools;
a second storage device for tools, the second storage device being in communication with the first storage device and the at least one tool spindle; and
a control device that is programmed to control operation of the machine tool, said operation of the machine tool comprising:
establishing a machining procedure on a workpiece, said machining procedure including:
a workpiece change operation that lasts for a respective duration of time,
a plurality of machining operations that collectively form a sequence of machining operations, each of the plurality of machining operations using a particular tool for a respective duration of time, and
a sequence of tool changes, wherein for each tool change, a respective tool is provided by the second storage device to the at least one tool spindle;
establishing a sequence of tool provision operations, wherein for each tool provision operation of the sequence of tool provision operations, a respective tool is transferred from the first storage device to the second storage device, each tool provision operation lasting for a respective duration of time;
determining during a determining stage the length of the respective durations of time of the workpiece change operation, each of the plurality of machining operations, and each of the tool provision operations;
executing during a control stage initial temporal grouping of each of the tool provision operations in relation to the workpiece change operation, and optionally, also in relation to respective machining operations of the plurality of machining operations; and after the initial temporal grouping,
optimizing the machining procedure such that idle times in which none of the plurality of machining operations or tool changes are occurring, and that resulted from the initial temporal grouping of the tool provision operations in relation to the workpiece change operation and optionally in relation to the respective machining operations, are either minimized or eliminated, wherein
optimization of the machining procedure is realized by temporally regrouping each of the tool provision operations such that one or more of the tool provision operations is temporally regrouped so as to occur in a sequence with another of the tool provision operations so that multiple ones of the tool provision operations occur between a start and an end of the duration of time of the workpiece change operation, and, optionally, so that multiple ones of the tool provision operations occur between a respective start and a respective end of one or more of the respective durations of time of the individual machining operations of the plurality of machining operations.

26. The machine tool according to claim 25, wherein the first storage device is arranged on the machine frame.

27. The machine tool according to claim 25, wherein the first storage device is formed as a circulating conveying device having a plurality of movable storage positions.

* * * * *